United States Patent
Atarashi et al.

(10) Patent No.: US 8,619,920 B2
(45) Date of Patent: Dec. 31, 2013

(54) TWO-DIMENSIONAL CODE SPREADING FOR INTERLEAVED FDMA SYSTEM

(75) Inventors: Hiroyuki Atarashi, Yokohama (JP);
Mamoru Sawahashi, Yokohama (JP);
Francois Po Shin Chin, Singapore (SG);
Zhongding Lei, Singapore (SG);
Xiaoming Peng, Singapore (SG);
Ying-Chang Liang, Singapore (SG)

(73) Assignees: NTT DoCoMo, Inc., Tokyo (JP);
Agency for Science, Technology and Research, Centros (SG)

( * ) Notice: Subject to any disclaimer, the term of this patent is extended or adjusted under 35 U.S.C. 154(b) by 224 days.

(21) Appl. No.: 13/127,485

(22) PCT Filed: Nov. 5, 2008

(86) PCT No.: PCT/JP2008/070536
§ 371 (c)(1),
(2), (4) Date: Jun. 15, 2011

(87) PCT Pub. No.: WO2010/052800
PCT Pub. Date: May 14, 2010

(65) Prior Publication Data
US 2011/0243197 A1    Oct. 6, 2011

(51) Int. Cl.
*H04L 27/06* (2006.01)
(52) U.S. Cl.
USPC ........... 375/340; 375/130; 375/131; 375/134; 375/137; 375/144; 375/146; 375/148; 375/150; 375/295; 375/346; 370/319; 370/335
(58) Field of Classification Search
CPC ..... H04B 1/692; H04L 5/0003; H04L 5/0016
USPC ......... 375/130, 131, 134, 137, 144, 146, 148, 375/150, 295, 340, 346; 370/319, 335

See application file for complete search history.

(56) References Cited

U.S. PATENT DOCUMENTS 7,372,889 B2 *   5/2008   Atarashi et al. ............... 375/130
7,684,463 B2 *   3/2010   Kawasaki ..................... 375/130

(Continued)

FOREIGN PATENT DOCUMENTS

| JP | 2000-332724 A | 11/2000 |
| JP | 2003-046481 A | 2/2003 |
| JP | 2006-229575 A | 8/2006 |

OTHER PUBLICATIONS

Goto et al. "Variable Spreading and Chip Repetition Factors (VSCRF)-CDMA in Reverse Link for Broadband Wireless Access", Sep. 2003, IEEE, pp. 254-259.*

(Continued)

*Primary Examiner* — Sophia Vlahos
(74) *Attorney, Agent, or Firm* — Osha Liang LLP

(57) ABSTRACT

A transmitter comprises a first spreading unit configured to multiply each of multiple data symbols with a first spreading code sequence of a first spreading factor; a compression and repetition unit configured to compress output signals of the first spreading unit in time domain and repeat the compressed signal L times (where L is a natural number greater than or equal to 2); a phase modulation unit configured to multiply the compressed and repeated signal with a user dependent phase and output a data block consisting of L sub-blocks; a second spreading unit configured to replicate the data block according to a second spreading factor and multiply each set of the replicated sub-blocks with a second spreading code sequence of the second spreading factor to produce a two-dimensionally spread signal; and a wireless transmission unit configured to transmit the two-dimensionally spread signal using a single-carrier transmission scheme.

4 Claims, 5 Drawing Sheets

(56) References Cited

U.S. PATENT DOCUMENTS

| | | | |
|---|---|---|---|
| 7,844,299 B2* | 11/2010 | Atarashi et al. | 455/561 |
| 7,936,739 B2* | 5/2011 | Goto et al. | 370/342 |
| 8,107,411 B2* | 1/2012 | Atarashi et al. | 370/320 |
| 8,295,787 B2* | 10/2012 | Kwak et al. | 455/103 |
| 2005/0276242 A1* | 12/2005 | Goto et al. | 370/328 |
| 2007/0014272 A1* | 1/2007 | Palanki et al. | 370/344 |
| 2007/0201569 A1* | 8/2007 | Pajukoski et al. | 375/260 |

OTHER PUBLICATIONS

Peng et al. "Block Spread IFDMA: An Improved Uplink Transmission Scheme", Sep. 2007, pp. 1-4.*

Peng et al. "Two-Layer Spreading CDMA: An Improved Method for Broadband Uplink Transmission", Sep. 25-28, 2005, Vehicular Technology Conference, IEEE, pp. 2068-2078.*

Notification of Grounds for Rejection for Japanese Patent Application No. 2011-533939 mailed Jun. 12, 2012, with English translation thereof (3 pages).

Goto et al., "Variable Spreading and Chip Repetition Factors (VSCRF)-CDMA in Reverse Link for Broadband Wireless Access," Wireless Laboratories, NTT DoCoMo, Inc., Kanagawa-ken, Japan (9 pages).

Patent Abstract for Japanese Publication No. 2003-046481 published Feb. 14, 2003 (1 page).

Patent Abstract for Japanese Publication No. 2006-229575 published Aug. 31, 2006 (1 page).

Patent Abstract for Japanese Publication No. 2000-332724 published Nov. 30, 2000 (1 page).

International Search Report from PCT/JP2008/070536 dated Jul. 20, 2009 (2 pages).

Written Opinion from PCT/JP2008/070536 dated Jul. 20, 2009 (8 pages).

Peng, Ziaoming et al.; "Two-Layer Spreading CDMA: An Improved Method for Broadband Uplink Transmission"; IEEE Transactions on Vehicular Technology; vol. 57, No. 6; Nov. 2008; pp. 3563-3577 (15 pages).

Hara, S. et al.; "Overview of Multicarrier CDMA"; IEEE Communications Magazine; Dec. 1997; pp. 126-133 (8 pages).

Schnell, M. et al.; "A Promising New Wideband Multiple-Access Scheme for Future Mobile Communications Systems"; Special Issue, vol. 10, No. 4; Jul.-Aug. 1999; pp. 417-427 (11 pages).

Schnell, M. et al.; "Interleaved FDMA: Equalization and Coded Performance in Mobile Radio Applications"; IEEE, 1999; pp. 1939-1944 (6 pages).

Goto, Y. et al.; "Variable Spreading and Chip Repetition Factors (VSCRF)-CDMA in Reverse Link for Broadband Wireless Acces"; Wireless Laboratories, NTT DoCoMo, Inc.; Sep. 2003 (6 pages).

* cited by examiner

TWO-DIMENSIONAL CODE SPREADING FOR INTERLEAVED FDMA SYSTEM

TECHNICAL FIELD

The present invention generally relates to a wireless communication technique in a multi-access environment, and more particularly, to a technique for applying two-dimensional code spreading to interleaved FDMA to reduce other-cell interference and multiple access interference.

BACKGROUND ART

The spectacular growth of video, voice, and data communications over the Internet and the equally rapid upsurge of mobile telephony are spurring wideband multiple access research to provide very high data rate transmission in wireless communication systems. Direct sequence code division multiple access (DS-CDMA) is one of the effective wireless access technologies for supporting high system capacity, including variable and high data rate transmission services, and DS-CDMA has been adopted in $3^{rd}$ generation wireless communication systems. See 3GPP Specification Home Page: http://www.3gpp.org/specs/specs.htm. Owing to its one-cell frequency reuse, DS-CDMA is advantageous in bandwidth efficiency compared to time-division multiple access (TDMA) in a multi-cell environment. However, conventional single-carrier DS-CDMA systems are associated with multiple access interfaces (MAI), which limits the maximum data rate and the system capacity that can be supported for available bandwidth, especially in hot spot environments with isolated or fewer co-existing cells not taking full advantage of one-cell frequency reuse.

Combining orthogonal frequency division multiplexing (OFDM) and CDMA, which is called multicarrier CDMA (MC-CDMA), can improve channel capacity utilization under multipath interference and frequency selective fading reception by multipath delay suppression and diversity gain. See S. Hara and R. Prasad, "Overview of Multicarrier CDMA", IEEE Comm. Mag., pp 126-133, December 1997. MC-CDMA has been proposed as a candidate for future wireless communication systems. Even though this technology can support high data rates and multiple users, it suffers from high peak-to-average power ratio (PAPR) problems and high sensitivity to frequency offset, RF noise, and channel estimation errors. These limit the applicability of MC-CDMA in practical wireless environments.

Recently, interleaved frequency-division multiple-access (IFDMA) has been introduced as a new wideband spread-spectrum multiple access scheme for both downlink and uplink mobile communications. See M. Schnel and I. De Broeck, "A promising new wideband multiple-access scheme for future mobile communication systems", European Trans. on Telecomm., Vol. 10, No. 4, pp. 417-427, July-August, 1999; and M. Schnel and I. De Broeck, "Interleaved FDMA: Equalization and coded performance in mobile radio applications", IEEE ICC '99, pp. 1939-1944, June 1999. The basic idea behind IFDMA is to combine spread-spectrum multicarrier transmission (spread signal bandwidth through signal compression and repetition) with frequency-division multiple-access (FDMA) to avoid MAI and be capable of achieving frequency diversity. Since IFDMA is an orthogonal multiple access scheme, there is, theoretically, no MAI in IFDMA systems. Compared to MC-CDMA, CDMA, and TDMA, IFDMA shows several additional advantages including continuous transmission and constant envelope (low PAPR).

More recently, variable spreading and chip repetition factor CDMA (VSCRF-CDMA) has been proposed as a promising candidate for uplink broadband wireless access. See Y. Goto, T. Kawamura, H. Atarashi, and M. Sawahashi, "Variable spreading and chip repetition factor (VSCRF)-CDMA in reverse link for broadband wireless access", IEEE PIMRC '03, September 2003. It combines IFDMA with CDMA to take advantages of both technologies. Specifically, VSCRF-CDMA uses two-layer spreading, i.e. code domain spreading as in CDMA and chip-compression-and-repetition (CCR) spreading as in IFDMA. In a multi-cell cellular system, VSCRF-CDMA sets the chip-repetition factor (CRF), which represents the number of users who can be supported by CCR spreading, to one, and it works just like a DS-CDMA system to realize one-cell frequency reuse. In a hot-spot system, CRF is set to more than one and total spreading factor (TSF) is the multiplication of CRF with the code-domain spreading factor (CSF). Orthogonality between users is maintained, and hence MAI is minimized by the introduced CCR spreading in the hot-spot systems as in IFDMA. Furthermore, seamless handoff can be realized for users going from one to another between the cellular system and the hot-spot system, due to the same air interface being deployed.

Other-cell interference (OCI) and MAI issues are crucial in wireless communication systems for spectrum utilization efficiency and system capacity. Although IFDMA is capable of eliminating MAI using CCR spreading, it cannot handle interference from other cells in the same carrier frequency. This is because CCR spreading has only limited interference suppression capability for the same carrier frequency, unlike code spreading gain or channel coding gain, although IFDMA realizes orthogonality between users at different carrier frequencies as in FDMA. Hence one-cell frequency reuse cannot be realized in IFDMA systems.

IFDMA-based VSCRF-CDMA mitigates this problem by using CDMA spreading in cellular systems and code spreading coupled with CCR spreading in hot-spot systems. For cellular systems, other-cell interference (OCI) is minimized through using CDMA code spreading gains and scrambling codes for randomizing interference. In isolated-cell or hot-spot environments, CDMA spreading is not performed because of substantially lower OCI while MAI is reduced by IFDMA-based CCR in each cell. Since CCR spreading is more capable of maintaining orthogonality between different users than code spreading, CCR spreading usually has a higher priority than code spreading to combat MAI. The code spreading in VSCRF-CDMA is a frequency domain spreading, and the orthogonality between different spreading codes (for both scrambling and channelization codes) is subject to frequency selectivity fading or delay spread of the channel. In a frequency selective wireless channel, CSF has to be small enough to maintain code orthogonality after passing through the channel. Therefore, VSCRF-CDMA has limited OCI suppression capability owing to small CSF.

Another cost of using IFDMA and VSCRF-CDMA to achieve the aforementioned advantages over other multiple access techniques is to allow inter-symbol interference (ISI). To reduce the ISI effect significantly, an optimal equalizer based on maximum-likelihood sequence estimation (MLSE) has to be employed at the receiver. The MLSE equalizer has higher complexity and it increases exponentially along with the Q factor, which is the number of symbols per block (unit block for performing repetition) to be transmitted in IFDMA or the number of chips per block (unit block for performing repetition after CDMA spreading) in VSCRF-CDMA.

In general, IFDMA is incapable of handling OCI and hence it is difficult for IFDMA systems to realize one-cell frequency reuse. VSCRF-CDMA mitigates this problem by combining IFDMA with CDMA. However, it has limited OCI suppression capability when using only frequency domain spreading with a small spreading factor. Furthermore, both IFDMA and VSCRF-CDMA require the complex MLSE detection at the receiver. Therefore, there is a need to combat OCI and MAI simultaneously and more efficiently, and to reduce receiver complexity substantially.

DISCLOSURE OF THE INVENTION

The present invention is conceived to overcome at least one of the aforementioned problems and aims to provide a wireless communication technique, including a transmitter, a receiver, a transmission method and a program, capable of reducing other-cell interference (OCI) and multiple access interference (MAI), as well as complexity in receiver structure.

To reduce OCI and MAI and to prevent the receiver structure from becoming complicated, two-dimensional code spreading is introduced in IFDMA systems.

In one aspect of the invention, a transmitter is provided. The transmitter comprises:
(a) a first spreading unit configured to multiply each of multiple data symbols with a first spreading code sequence of a first spreading factor;
(b) a compression and repetition unit configured to compress the output signals of the first spreading unit in time domain and repeat the compressed signal L times (where L is a natural number greater than or equal to 2);
(c) a phase modulation unit configured to multiply the output of the compression and repetition unit with a user dependent phase and output a data block consisting of L sub-blocks;
(d) a second spreading unit configured to replicate the data block according to a second spreading factor and multiply each set of the replicated sub-blocks having a same content with a second spreading code sequence of the second spreading factor to produce a two-dimensionally spread signal; and
(e) a wireless transmission unit configured to transmit the two-dimensionally spread signal using a single-carrier transmission scheme.

In another aspect of the invention, a receiver configured to recover transmitted symbols from despread data symbols is provided. The receiver comprises:
(a) a receiving unit configured to receive a prescribed number ($SF_t$) of data blocks transmitted by a single-carrier transmission scheme, each block consisting of L sub-blocks;
(b) a first despreading unit configured to multiply each set of $SF_t$ sub-blocks by a first spreading code of a spreading factor $SF_t$;
(c) a phase demodulation unit configured to multiply the output of the first despreading unit with a user dependent phase to perform phase demodulation;
(d) a second dispreading unit configured to multiply each of elements defining the phase demodulated signal with a second spreading code of a spreading factor $SF_f$ and output data symbols, where L, $SF_t$ and $SF_f$ are natural numbers greater than or equal to 2.

By performing two-dimensional code spreading (in frequency domain and time domain) for IFDMA, other-cell interference (OCI) and multiple access interference (MAI) can be reduced in wireless communication systems.

Since 2CS-IFDMA is applicable in both cellular and hotspot systems, seamless handoff between the two systems will be supported.

BRIEF DESCRIPTION OF THE DRAWINGS

Other features and advantages of the invention will become more apparent from the following detailed description when read in conjunction with the accompanying drawings, in which.

DETAILED DESCRIPTION OF THE PREFERRED EMBODIMENT

Description of Notations

Figure 1:
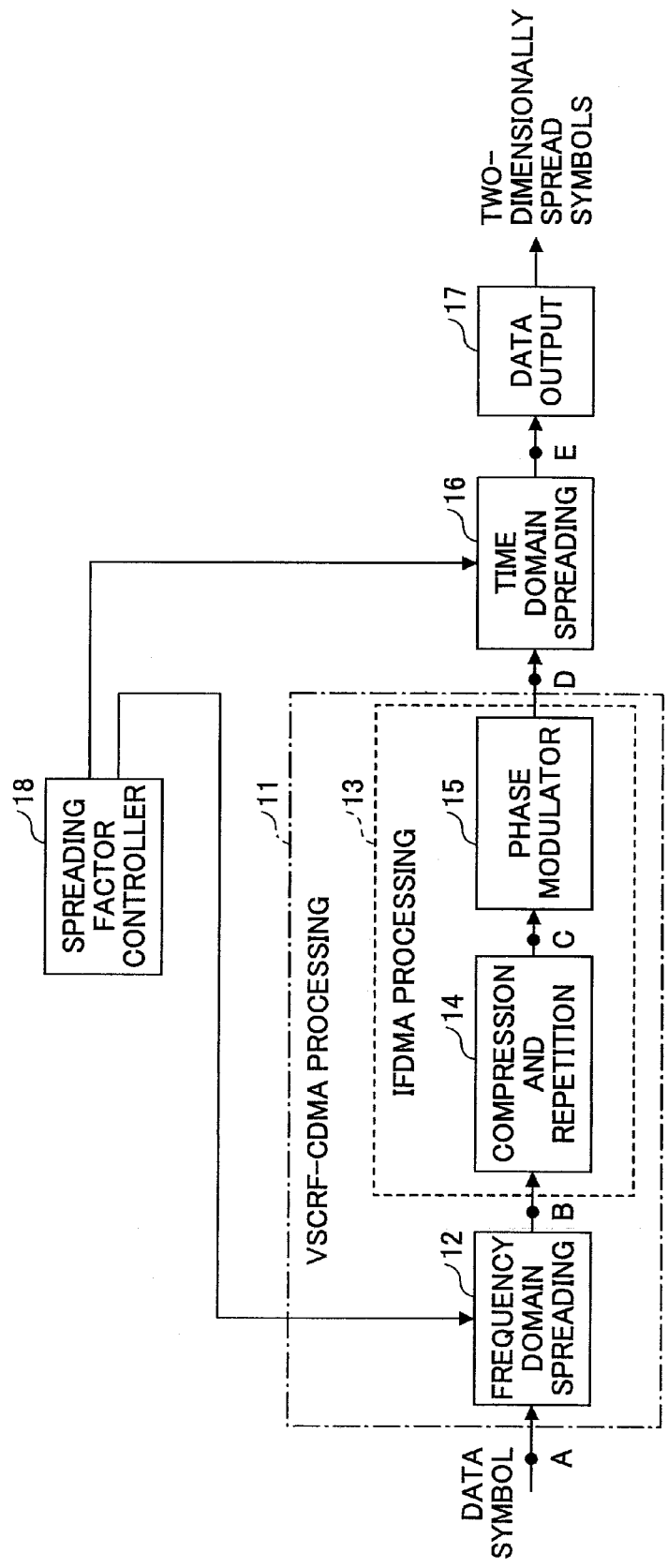
FIG. 1 is a schematic block diagram of a transmitter of a 2CS-IFDMA transceiver according to an embodiment of the invention.

11 VSCRF-CDMA processing unit
12 frequency domain spreading unit
13 IFDMA processing unit
14 compression and repetition unit
15 phase modulator
16 time domain spreading unit
17 data output unit
18 spreading factor controller
41 time domain despreading unit
42 phase demodulator
43 fast Fourier transform (FFT) unit
44 frequency domain equalizer
45 inverse fast Fourier transform (IFFT) unit
46 frequency domain despreading unit
47 spreading factor controller

BEST MODE OF CARRYING OUT THE INVENTION

The preferred embodiment of the present invention is described below in conjunction with the attached drawings.

First, the basic idea of the present invention is explained. Two-dimensional code spreading for interleaved FDMA (2CS-IFDMA) is similar to VSCRF-CDMA in concept, that is, introducing code spreading in an IFDMA system. A new dimension, time domain, is incorporated into code spreading on top of frequency domain spreading as in a VSCRF-CDMA system. However, the two-dimensional spreading of 2CS-IFDMA of the present invention is not a straightforward extension to frequency domain spreading of VSCRF-CDMA. Since in VSCRF-CDMA or IFDMA systems, a single carrier scheme is employed and the time domain is not readily separated from frequency domain, unlike in multicarrier DS-CDMA systems, existing two-dimensional code spreading techniques, which are based on multicarrier DSA-CDMA systems, cannot be simply applied to IFDMA systems as they are.

In the preferred embodiment, time domain spreading is performed in addition to frequency domain spreading. To be more precise, copies or replicas of a data block, which data block has been subjected to frequency domain code spreading, compression and repetition, and phase modulation, are made in accordance with the spreading factor of a time domain spreading code, and a set of replicas of each of the sub-blocks in the data block are multiplied by the time domain spreading code sequence. As a result, redundancy is increased for each information item to be transmitted, as compared with conventional VSCRF-CDMA, to the extent of the replication. Because reliability of data transmission is improved along with the increase in redundancy, this technique is especially advantageous for uplink transmission in which more emphasis is placed on signal transmission reliability.

Time domain spreading is generally more capable of maintaining code orthogonality in a wireless channel likely to be subjected to frequency selective fading. Variations are usually negligible in the time domain for the duration of one or a few IFDMA symbols compared with frequency domain variations. Combined with frequency domain spreading, 2CS-IFDMA according to the embodiment can combat fading channels more efficiently because code spreading factors in time and frequency domains may be adjusted according to channel statistical conditions, such as Doppler spread (or user mobility) and delay spread (frequency selectivity). 2CS-IFDMA has a better OCI suppression capability than VSCRF-CDMA because the total spreading factor can be maintained large by increasing the time domain spreading factor even if the frequency domain spreading factor is reduced. Combining chip compression and repetition (CCR) with orthogonalization of simultaneously accessing users in the frequency domain, 2CS-IFDMA has more power and flexibility to reduce MAI or accommodate more users. Moreover, a large spreading factor in the time domain (SFT) will only incur minimal complexity increase at the receiver because of frequency domain equalizers employed.

Embodiment 1

FIG. 1 is a block diagram of the transmitter of a 2CS-OFDMA transceiver of a single user. The transmitter is typically applied to mobile or cellular devices; however, it may be applied to other devices. The transmitter includes a VSCRF-CDMA processing unit 11, a time domain spreading unit 16, a data output unit 17, and a spreading factor controller 18. The VSCRF-CDMA processing unit 11 includes a frequency domain spreading unit 12, and an IFDMA processing unit 13 which further includes a compression and repetition unit 14 and a phase modulator 15.

The VSCRF-CDMA processing unit 11 spreads data symbols using a VSCRF-CDMA scheme, and outputs the data symbols spread in the frequency domain. To be more precise, data symbols having been subjected to channel coding and data modulation are input to the frequency domain spreading unit 12, which unit multiplies the input data symbols with a spreading code to perform code spreading in the frequency domain and supplies the code spread data symbols to the IFDMA processing unit 13. In the IFDMA processing unit 13 configured to produce a signal using an interleaved FDMA scheme, the compression and repetition unit 14 compresses the frequency domain code spread data symbols along the time axis, and repeats the compressed data symbols a prescribed number of times. The phase modulator 15 multiplies the compressed and repeated data symbols with a phase for each user (to perform phase modulation) to make data items of individual users distinctive from each other.

The time domain spreading unit 16 makes copies or replicas of a phase modulated data block with a prescribed length, and multiplies the replicated data blocks with a time domain spreading code sequence to perform code spreading in the time domain.

The data output unit 17 outputs the time domain spread data symbols to the RF processing unit (not shown).

The spreading factor controller 18 adjusts the ratio between the frequency domain spreading code sequence (or spreading factor) and the time domain spreading code sequence (or spreading factor) according to instruction signals, which signals may be determined by the spreading factor controller 18 or supplied from a counterpart communication node currently in communication. Typically, such instruction signals are determined by a base station according to the uplink channel conditions. In this embodiment, the total spreading factor (TSF) is represented as a product of a frequency domain code spreading factor (CSF or $SF_f$), a chip compression and repetition factor (CCR), and a time domain spreading factor ($SF_t$). When the frequency domain channel fluctuation is conspicuous with small channel fluctuations in the time domain, at least one of the $SF_f$ and CCR is set smaller, while increasing $SF_t$, to maintain the intersymbol orthogonality as much as possible.

Figure 2:
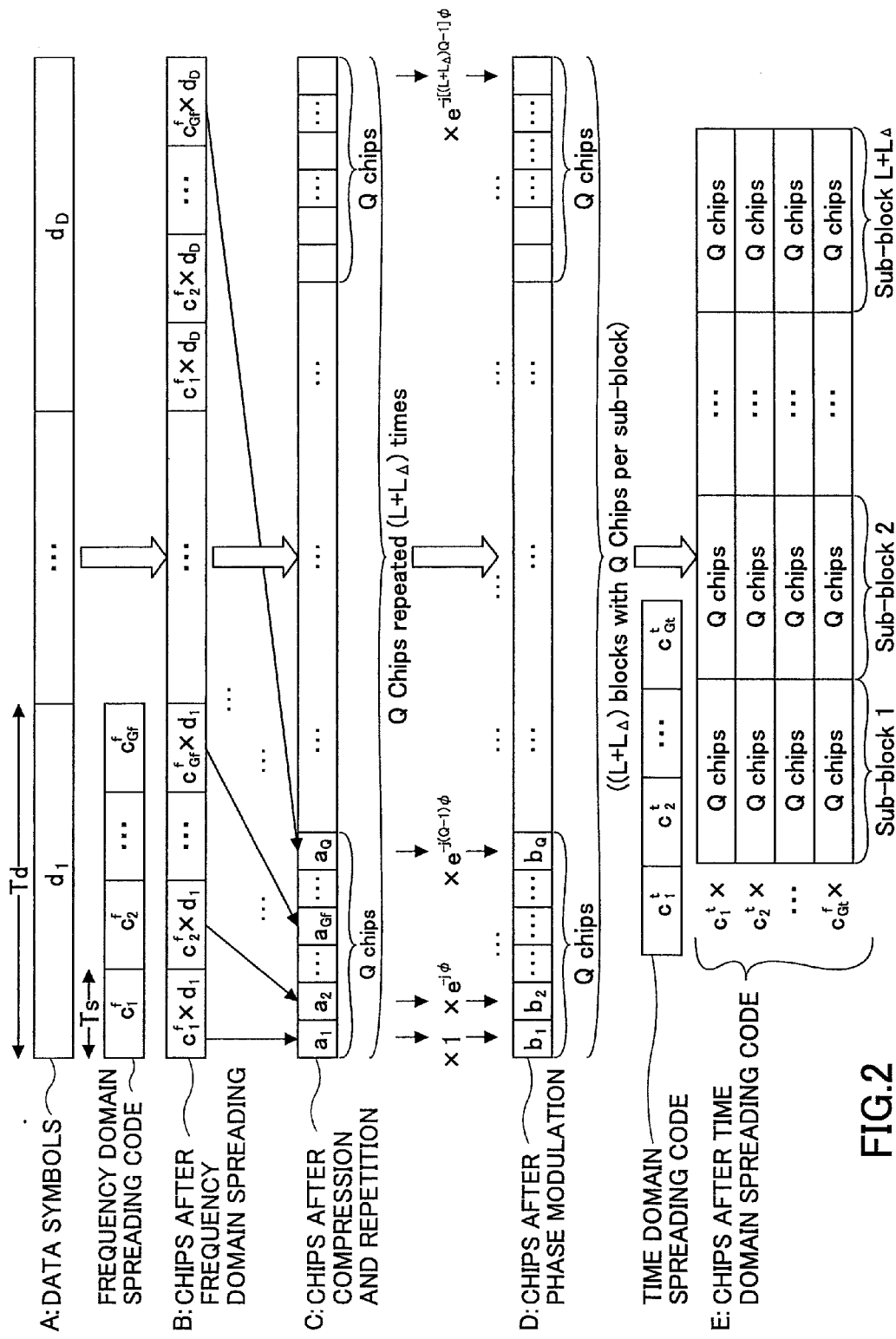
FIG. 2 illustrates operations carried out by the transmitter shown in FIG. 1.

FIG. 2 illustrates operations carried out by the transmitter shown in FIG. 1. Signals represented by symbols A through E in FIG. 2 correspond to those appearing at nodes A through F shown in FIG. 1.

(A) Channel coded and modulated data symbols $d_1, d_2, \ldots d_D$ with length D defining vector $d=(d_1, d_2, \ldots d_D)$ appear at input node A of the frequency domain spreading unit 12. The length or the number of data symbols defining the input vector may be selected appropriately depending on use.

(B) In the frequency domain spreading unit 12, each of the D symbols is multiplied by a spreading code vector $c^f=(c^f_1, c^f_2, \ldots c^f_{Gf})$ with spreading factor $G_f$, which process is the first spreading in the frequency domain. The chips after frequency domain spreading, i.e. spread chips, output through node B are written as $$b = s \otimes c^f, \qquad (1)$$

where $s=(s_1, s_2, \ldots s_{Gf}, s_{Gf+1}, \ldots s_{2Gf}, \ldots s_Q)$ and $Q=D \times G_f$. Operand "$\otimes$" in Equation (1) stands for the Kronecker product. As is apparent from FIG. 2, a relationship $T_d = G_f \times T_s$ holds among the data symbol duration $T_d$, the spread chip duration $T_s$, and the spreading factor $G_f$. The transmission bandwidth is spread by a factor of $G_f$ after frequency domain spreading.

(C) The spread chips are supplied to the IFDMA processing unit 13. The IFDMA processing unit 13 takes in a block of Q spread chips (corresponding to D modulated data symbols) at a time with a block duration $T_k = D \times T_d = Q \times T_s$. At the compression and repetition unit 14, a unit block of Q ($Q=D \times G_f$) chips are taken in and compressed $L+L_\Delta$ times to chip duration $T_c = T_s/(L+L_\Delta)$, where L denotes the effective symbol duration and $L_\Delta$ denotes a guard interval inserted to allow coarse time synchronization among simultaneously accessing users and to avoid interference between spread chips. The size of $L_\Delta$ can be set independent from L. The compressed and repeated chips are output from node C of the compression and repetition unit 14.

(D) The chips with dimension $(L+L_\Delta) \times Q$ after compression and repetition are then phase modulated through element-wise multiplication with a user dependent phase vector of dimension $(L+L_\Delta) \times Q$ having component $\exp(-j(l-1)\phi(u))$, ($l=1, \ldots Q, Q+1, \ldots 2Q, \ldots (L+L_\Delta) \times Q$). The user dependent phase $\phi(u)$ for user u is chosen to be $2\pi u/(L+L_x)Q$. The user index u will be dropped hereinafter for simplification of notation. Hence, a $(L+L_\Delta)Q$-chip block after phase modulation is expressed as $$b = (b_1, b_2, \ldots, b_{(L+L_\Delta)Q}) = (a_1, a_2^* \exp(-j\phi), \ldots a_{LQ}^* \exp(-j[(L+L_\Delta)Q-1]\phi), \qquad (2)$$

where $a_l = s_{l \bmod G_f}$ (l=1, ..., (L+L_A)×Q). The signal expressed by Equation (2) appears at node D of the phase modulator 15. It should be noted that the phase modulation in IFDMA is unique and different in concept from well-known phase modulations such as BPSK, QPSK, etc. The element-wise multiplication (phase modulation in IFDMA) assures user discrimination by assigning to each user a set of subcarriers orthogonal to the subcarrier sets of all other users to avoid MAI.

Figure 3:
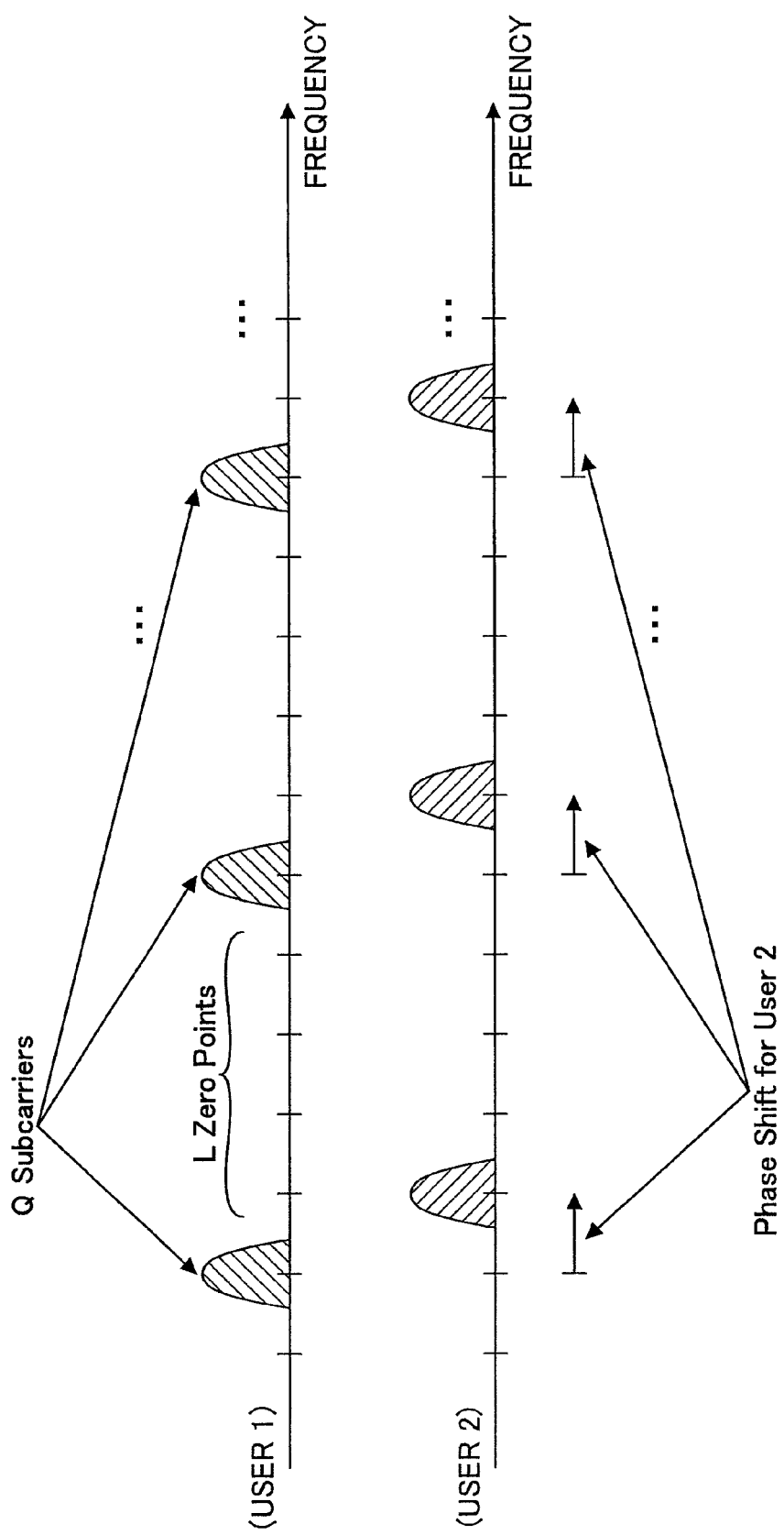
FIG. 3 is a schematic diagram illustrating an example of frequency spectra in VSCRF-IFDMA transmission.

After compression and repetition, the transmission bandwidth is spread further by a factor of L compared to the frequency domain code-spread chip rate. Moreover, the frequency spectrum becomes comb-shaped with Q subcarriers equally distributed within the whole transmission bandwidth and L zero points in between due to the repetition (see FIG. 3). Although in this embodiment a single-carrier scheme is employed, multiple subcarrier components appear at multiple positions along the frequency axis through chip compression and repetition. The subcarrier position at node C after compression and repetition is in common for all the users; however, the subcarrier positions at node D after phase modulation vary along the frequency axis among users, and the comb-shaped spectrum of a user is orthogonal to those of all other users. The total bandwidth spread is now $L \times G_f$. Generally, the greater $G_f$ is, the more the IFDMA-based system can suppress OCI because it is the frequency domain spreading factor. On the other hand, the greater L the more capability the IFDMA based system can suppress MAI because it is a measure of "distance" (or the number of zeros) between different users subcarriers. In IFDMA, G=1, and hence it cannot handle interference from other cells in the same carrier frequency (therefore one-cell frequency reuse cannot be realized in IFDMA). In VSCRF-CDMA, $G_f$ and L are appropriately selected so as to reduce OCI and MAI at the same time.

(E) Time domain code spreading is performed on the phase modulated chips. The phase modulated signal (D) contains (L+L_A)×Q chips in a unit processing block. In other words, the processing block includes (L+L_A) sub-blocks, each containing Q chips. The time domain spreading unit 16 takes the (L+L_A)×Q chips together, and generates a spread matrix of size $G_t$ by (L+L_A)×Q, where $G_t$ is the time domain spreading factor. Compared with frequency domain variations, channel variations are negligible in the time domain for the duration of one spreading block (which is on the order of microseconds) and hence the code orthogonality for time domain spreading is maintained. This means that time domain spreading is advantageous for MAI suppression. It should be noted that the time domain spreading (or two-dimensional spreading) is employed in channelization to combat MAI as well as cell specifying to combat OCI.

The time domain spreading unit 16 then takes each column (consisting of $G_t$ Q-chip sub-blocks) from the $G_t$ by (L+L_A)×Q matrix, and multiplies the $G_t$ Q-chip sub-blocks (having the same contents) with the time domain spreading code $c^t = (c^t_1, c^t_2, \ldots c^t_{G_t})$. This operation is performed on all of the (L+L_A) columns. The chips after the time domain code spreading (signal E in FIG. 2) are supplied to the data output unit 17. The data output unit 17 supplies a data set of the two-dimensionally spread symbols to the later-stage RF unit (not shown). To be more precise, the data output unit 17 successively takes in and outputs each of the serial streams of $G_t$ blocks from the matrix signal E shown in FIG. 2. The output signal is then subjected to pulse shaping and RF conversion, and transmitted through a wireless channel. In the example shown in FIG. 2, the time domain spreading code sequence is arranged along the column, and (L+L_A) sub-blocks are arranged along the rows in the matrix. However, the directions of chip arrangement may be appropriately determined.

It should be noted that an interleaver (not shown in FIG. 1) may be optionally added right after the phase modulation unit 15 to randomize signal chips so as to increase the system frequency domain diversity.

Figure 4:
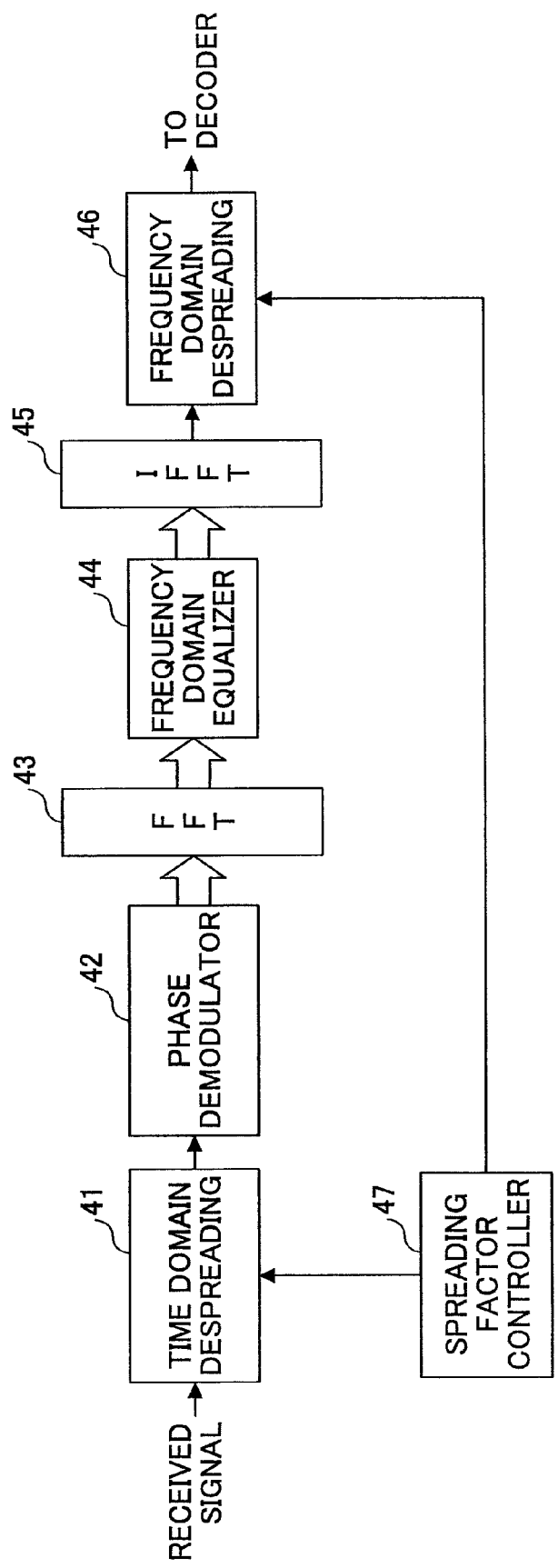
FIG. 4 is a schematic block diagram of a receiver of a 2CS-IFDMA transceiver according to an embodiment of the invention.

FIG. 4 is a block diagram of a receiver of the 2CS-IFDMA transceiver according to an embodiment of the invention. The receiver is typically provided in a base station; however, it may be furnished in other kinds of apparatuses. The receiver basically performs operations the reverse of the transmitter shown in FIG. 1, and in addition, it performs equalization in the frequency domain to further improve the receiving quality. The receiver includes a time domain despreading unit 41, a phase demodulator 42, a fast Fourier transform (FFT) unit 43, a frequency domain equalizer 44, an inverse fast Fourier transform (IFFT) unit 45, a frequency domain despreading unit 46, and a spreading factor controller 47.

The time domain despreading unit 41 multiplies the received signal with a time domain spreading code (of spreading factor $G_t$) to perform code despreading in the time domain. This process is associated with the operation of the time domain spreading unit 16 shown in FIG. 1.

The phase demodulator 42 multiplies the time-domain despread signal with a user dependent phase to perform phase demodulation. This process is associated with the operation of the phase modulator 15 shown in FIG. 1.

The FFT unit 43 performs fast Fourier transform to convert the phase demodulated signal to a frequency domain signal. The frequency domain equalizer 44 performs equalization in the frequency domain. The IFFT unit 45 performs inverse fast Fourier transform on the equalized signal. The frequency domain despreading unit 46 multiplies the equalized and inverse Fourier transformed signal with a frequency domain spreading code (of spreading factor $G_f$) to perform code despreading in the frequency domain.

The spreading factor controller 47 adjusts the ratio between the spreading factor $G_f$ of the frequency domain spreading code and the spreading factor $G_t$ of the time domain spreading code based on the frequency domain and time domain spreading factors of the received signal.

Figure 5:
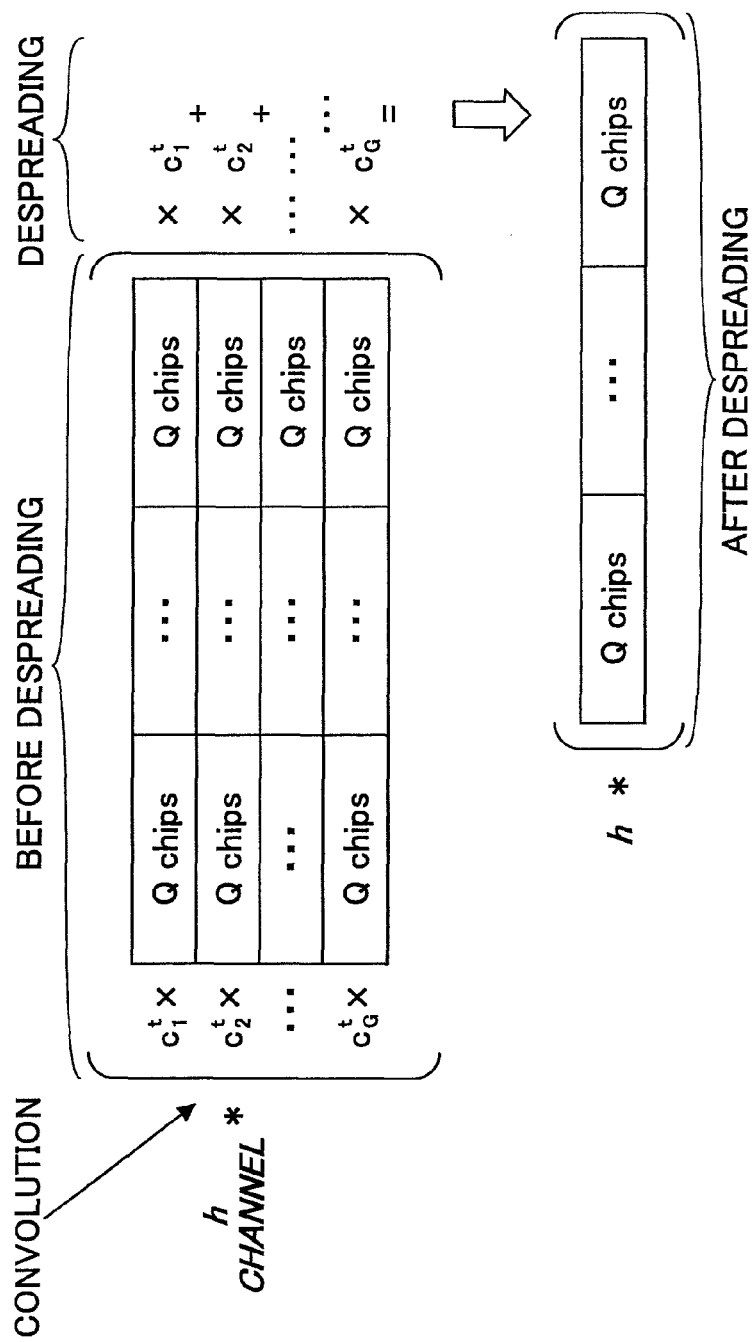
FIG. 5 illustrates operations carried out by the receiver shown in FIG. 4.

FIG. 5 illustrates despreading operations performed in the receiver shown in FIG. 4. A signal transmitted from the transmitter is received at the antenna of the receiver through a wireless channel. The received signal vector y is expressed as $$y = h * x + n, \qquad (3)$$

where h is the channel matrix of the wireless channel with components $h_m$ (m=0, ... M; M representing the number of taps in a channel impulse response), x is the transmission signal, symbol "*" denotes linear convolution, and n is the additive white Gaussian noise (AWGN). The transmission signal x corresponds to the $G_t$ block data, each block containing (L+L_A) Q-chip sub-blocks, illustrated as signal E in FIG. 2.

The received signal (a series of $G_t$ blocks) is stacked up block-by-block corresponding to a time domain spreading matrix (i.e., a $G_t$ by (L+L_A) matrix), as illustrated in FIG. 5. The input data for the time domain despreading unit 41 is the convolved output of chip blocks with channel vector h, having Gt rows and (L+L_A) Q-chip columns. To despread, each row is multiplied with the corresponding chip of the user's spreading code (time-domain) and added row-wise. It is assumed that time domain channel variation during transmission of $G_t$ blocks is negligible. In multi-cell or multiuser environments, OCI and MAI are suppressed by a factor of $G_t$ through the time domain code spreading and despreading.

Although not shown in FIG. 5, a deinterleaver may be placed after the time domain despreading unit 41 if an interleaver is employed at the transmitter.

The time-domain despread chips are then fed to phase demodulator 42 where the signal is demodulated as $$s_q = \sum_{l=1+L\Delta}^{L+L\Delta} e^{j[(l-1)-Q+q]\phi} \cdot b_{(l-1)Q+q}, \quad q = 1 \ldots Q, \quad (4)$$

where $b_{(l-1)Q+q}$ is the $[(l-1)Q+q]^{th}$ element of the despread chips corresponding to transmit chips after demodulation b shown in Equation (2). Similar to the IFDMA receiver, the demodulated signal $s_q$ (q=1, ... Q) is rewritten as $$s = s \oplus h + n, \quad (5)$$

where n is the resulting Q-dimensional AWGN vector and h is the Q-dimensional channel impulse response vector, whose entries are given by $$h_q = \begin{cases} \sum_{n=0}^{\lfloor (M-q)/Q \rfloor} h_{q+nQ} \cdot e^{j(q+nQ)\phi}, & q \le M, \\ 0, & q > M. \end{cases} \quad (6)$$

where M is the number of taps of the channel impulse response vector. Vectors s and h are (cyclically) convolved.

After phase demodulation, the Q demodulated chips are passed to the FFT unit 43 with FFT size Q. Denoting the Fourier transform matrix as F, the Q-chip vector after RRT is expressed as $$\hat{S} = \text{diag}(H) \cdot S + N, \quad (7)$$

where diag(x) is a diagonal matrix with diagonal elements the same as that of the vector x, S=F·s, H=F·h, and N=F·n.

The FFT output is then passed to the frequency domain equalizer 44. Each element of vector $\hat{S}$ is affected by AWGN. Therefore, simple one-tap equalization is available to provide an estimate of S. For example, one-tap zero forcing equalizer estimates each element of S, i.e. Sq (q=1, ... Q), by multiplying $\hat{S}q$ with inversion of the q-th element of H, $(Hq)^{-1}$. Minimum-mean-square-error one-tap equalizes estimates Sq by multiplying $\hat{S}q$ with $(|Hq|^2+\sigma^2)^{-1}$, where $\sigma^2$ is the noise power. It should be noted that a time domain equalizer, such as a conventional MLSE equalizer, requires complicated arithmetic operations (for processing multiple taps), while a frequency domain equalizer achieves equalization by simple one-tap operations.

Denoting the estimation error of S is $\epsilon$, so that the Q-chip vector after frequency domain equalization can be written as F·s+$\epsilon$. After IFFT operations, the resulting Q-chip vector is $$F^{-1} \cdot (F \cdot s) + F^{-1} \cdot \epsilon = s + F^{-1} \cdot \epsilon \quad (8)$$

a good approximation of s with estimation error $F^{-1} \cdot \epsilon$.

The equalized signal is fed to the frequency domain despreading unit 46, where each $G_f$-chip sub-block of the input is multiplied with frequency domain spreading code $c^f$ and summed up to produce the detection of transmitted symbols. After the frequency domain despreading, MAI and OCI are suppressed further by a factor of $G_f$. Finally, the detected symbols are passed to a decoder corresponding to the channel encoding, and the transmitted signal is recovered through further operations.

The FFT unit 43, the frequency domain equalizer 44 and the IFFT 45 used in the aforementioned embodiment are optional for 2CS-IFDMA; however, frequency-domain equalization is advantageous when performing single-carrier data transmission. In general, multicarrier transmission is superior to single-carrier transmission as long as the peak-to-average power ratio issues are overcome. However, the receiving quality can be improved by performing frequency-domain equalization even with a single-carrier transmission scheme, and signal quality as high as that in a multicarrier transmission scheme can be achieved. Less complexity of the frequency-domain equalizer is also an advantage, as compared with the time-domain equalizer.

Although not shown in FIG. 5, the phase demodulated signal is decompressed in the time domain to output D decompressed signals, and each of the D decompressed signals is multiplied by the frequency-domain spreading code to recover D transmitted symbols.

The invention claimed is:

1. A receiver configured to recover transmitted symbols from despread data symbols, comprising:
   a receiving unit configured to receive a prescribed number ($SF_t$) of data blocks transmitted by a single-carrier transmission scheme, each data block consisting of L sub-blocks;
   a first despreading unit configured to multiply each of the prescribed number ($SF_t$) of data blocks by a first spreading code of a first spreading factor $SF_t$ to output a despread signal;
   a phase demodulation unit configured to multiply the despread signal with a user dependent phase to output a phase demodulated signal;
   a second despreading unit configured to multiply the phase demodulated signal with a second spreading code of a second spreading factor $SF_f$ and output data symbols, where L, $SF_t$, and $SF_f$ are natural numbers greater than or equal to 2; and
   a combination of a Fourier transform unit, a frequency domain equalizer, and an inverse Fourier transform unit inserted between the phase demodulation unit and the second despreading unit.

2. A base station having the receiver of claim 1.

3. A data recovery method comprising the steps of:
   receiving a prescribed number ($SF_t$) of data blocks transmitted by a single-carrier transmission scheme, each block consisting of a set of L sub-blocks;
   multiplying the $SF_t$ data blocks by a first spreading code of a first spreading factor $SF_t$ to output a despread signal;
   multiplying the despread signal with a user dependent phase to output a phase demodulated signal; and
   multiplying the phase demodulated signal with a second spreading code of a second spreading factor $SF_f$ to perform second despreading and outputting data symbols, where L, SFt, and SFf are natural numbers greater than or equal to 2,
   wherein Fourier transforming, frequency domain equalizing, and inverse Fourier transforming are performed between the multiplying the despread signal step and the multiplying the phase demodulated signal step.

4. A program product installable in a computer to cause the computer to perform the steps of:
   receiving a prescribed number ($SF_t$) of data blocks having same content and transmitted by a single-carrier transmission scheme, each data block consisting of L sub-blocks with same content;

multiplying the $SF_t$ data blocks by a first spreading code of a first spreading factor $SF_t$ and outputting a despread signal;

multiplying the despread signal with a user dependent phase to perform phase demodulation and outputting a phase demodulated signal; and multiplying the phase demodulated signal with a second spreading code of a second spreading factor $SF_f$ to perform second despreading and outputting data symbols, where L, $SF_t$, and $SF_f$ are natural numbers greater than or equal to 2, wherein Fourier transforming, frequency domain equalizing, and inverse Fourier transforming are performed between the multiplying the despread signal step and the multiplying the phase demodulated signal step.

* * * * *